US012634737B2

(12) United States Patent (10) Patent No.: US 12,634,737 B2

Hu et al. (45) Date of Patent: May 19, 2026

(54) MEASUREMENT GAP ENHANCEMENT METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Rongyi Hu, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 329 days.

(21) Appl. No.: 18/242,341

(22) Filed: Sep. 5, 2023

(65) Prior Publication Data

US 2023/0413095 A1 Dec. 21, 2023

Related U.S. Application Data

(63) Continuation of application No. PCT/CN2021/079391, filed on Mar. 5, 2021.

(51) Int. Cl.
*H04W 24/10* (2009.01)
*H04W 76/15* (2018.01)

(52) U.S. Cl.
CPC ........... *H04W 24/10* (2013.01); *H04W 76/15* (2018.02)

(58) Field of Classification Search
CPC . H04W 24/10; H04W 64/00; H04W 72/1268; H04W 72/1273; H04L 5/00
See application file for complete search history.

(56) References Cited

U.S. PATENT DOCUMENTS

| | | | |
|---|---|---|---|
| 10,356,646 B2 | 7/2019 | Wu | |
| 2016/0044543 A1* | 2/2016 | Nemeth | H04W 36/0085 |
| | | | 370/332 |
| 2018/0302942 A1 | 10/2018 | Wu | |

(Continued)

FOREIGN PATENT DOCUMENTS

| | | |
|---|---|---|
| CN | 107431957 A | 12/2017 |
| CN | 108738150 A | 11/2018 |

(Continued)

OTHER PUBLICATIONS

Ericsson: "On parallel measurement gap patterns", 3GPP Draft; R4-2102535, 3rd Ceneration Partnership Project (3GPP), Mobile Competence Centre ; 650, Route Des Lucioles ; E-06921 Sophia-Antipolis Cedex; France vol. RAN WG4, No. Electronic Meeting;Jan. 25, 2021-Feb. 5, 2021, Jan. 15, 2021 (Jan. 15, 2021), XP052180779, pp. 3,6, 3 pages.

(Continued)

*Primary Examiner* — Iqbal Zaidi
(74) *Attorney, Agent, or Firm* — BAYES PLLC

(57) ABSTRACT

Provided in the embodiments of the present application are a measurement gap enhancement method and apparatus, a terminal device, and a network device. The method includes: a terminal device receives configuration information of coexisting measurement gaps, the coexisting measurement gaps comprising a plurality of measurement gaps, and the plurality of measurement gaps being configured in a first time period and/or the plurality of measurement gaps being used for measurement in a second time period.

20 Claims, 3 Drawing Sheets

Device for enhancing a measurement gap

Receiving unit 301

(56) References Cited

U.S. PATENT DOCUMENTS

| | | | |
|---|---|---|---|
| 2019/0342801 A1 | 11/2019 | Cui | |
| 2021/0029566 A1 | 1/2021 | Li | |
| 2021/0337377 A1* | 10/2021 | Manolakos | G01S 5/0236 |
| 2024/0244469 A1* | 7/2024 | Axmon | H04W 72/1268 |

FOREIGN PATENT DOCUMENTS

| | | |
|---|---|---|
| CN | 110381528 A | 10/2019 |
| WO | 2020068828 A1 | 4/2020 |

OTHER PUBLICATIONS

Moderator (Mediatek Inc): "Email discussion summary for [98e] [233] NR_MG_enh_1", 3GPP Draft; R4-2103472, 3rd Generation Partnership Project (3GPP), Mobile Competence Centre ; 650, Route Des Lucioles ; E-06921 Sophia-Antipolis Cedex; France vol. RAN WG4, No. Electronic Meeting; Jan. 25, 2021-Feb. 5, 2021, Feb. 9, 2021 (Feb. 9, 2021), XP051979395, section 2 "Discussion", 38 pages.

Mediatek Inc: "WF on R17 NR MG enhancements—Multiple concurrent and independent MG patterns", 3GPP Draft; R4-2104096, 3rd Generation Partnership Project(3GPP), Mobile Competence Centre ; 650, Route Des Lucioles ; E-06921 Sophia-Antipolis Cedex; France vol. RAN NG4, No. e Meeting; Jan. 25, 2021-Feb. 5, 2021, Feb. 9, 2021 (Feb. 9, 2021), XP051979923, p. 7, "Proposal 7", and "Proposal 8", 10 pages.

Intel Corporation: "Clarification on UE measurement mode with gap", 3GPP Draft; R4-1801827 Clarification on VE Measurement Mode With Gap V3, 3rd Generation Partnership Project (3GPP), Mobile Competence Centre ; 650, Route Des Lucioles ; F-06921 Sophia-Antipolis Cedex vol. RAN WG4, No. Athens, Greece; Feb. 26, 2018-Mar. 2, 2018, Feb. 19, 2018 (Feb. 19, 2018), XP051403138, p. 2, sections 3 and 4 of the "box" at the top of the page, 5 pages.

Oppo: "Views on Multiple concurrent and independent MG patterns for NR_MG_enh", 3GPP Draft; R4-2101538, 3rd Generation Partnership Project (3GPP), Mobilecompetence Centre ; 650, Route Des Lucioles ; F-06921 Sophia-Antipolis Cedex; France vol. RAN WG4, No. Electronic Meeting; Jan. 25, 2021-Feb. 5, 2021, Jan. 15, 2021 (Jan. 15, 2021), XP052180042, p. 2, line 1-line 2, 3 pages.

Supplementary European Search Report in the European application No. 21928590.5, mailed on Mar. 19, 2024, 13 pages.

International Search Report in the international application No. PCT/CN2021/079391, mailed on Nov. 17, 2021. 6 pages with English translation.

Written Opinion of the International Search Authority in the international application No. PCT/CN2021/079391, mailed on Nov. 17, 2021. 9 pages with English translation.

3GPP TSG RAN Meeting #90e RP-202658, Electronic Meeting, Dec. 7-11, 2020 (revision of RP-202119), Source: Intel Corporation, MediaTek Inc., Title: Revised WID on NR and MR-DC measurement gap enhancements, Document for: Approval, Agenda Item: 9.8.23. The whole document. 5 pages.

3GPP TS 38.133 V16.6.0 (Dec. 2020), 3rd Generation Partnership Project; Technical Specification Group Radio Access Network; NR; Requirements for support of radio resource management (Release 16). Chapter 9. 1655 pages.

* cited by examiner

100

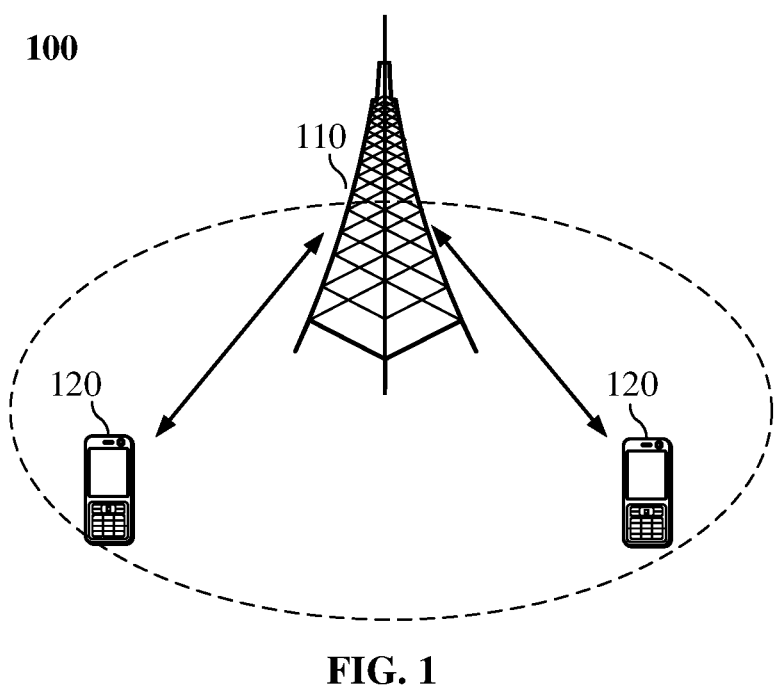

FIG. 1

| |
|---|
| The terminal device receives configuration information of a concurrent gap, the concurrent gap includes a plurality of measurement gaps, and the plurality of measurement gaps are configured in a first time period and/or the plurality of measurement gaps are used for measurement in a second time period |

| Device for enhancing a measurement gap |
|---|
| Receiving unit 301 |

FIG. 3

Device for enhancing a measurement gap

Transmitting unit 401

Communication device 500

Memory 520

Processor 510

Transceiver 530

MEASUREMENT GAP ENHANCEMENT METHOD AND APPARATUS, TERMINAL DEVICE, AND NETWORK DEVICE

CROSS-REFERENCE TO RELATED APPLICATION

This application is a continuation of International Patent Application No. PCT/CN2021/079391, filed on Mar. 5, 2021, entitled "MEASUREMENT GAP ENHANCEMENT METHOD AND APPARATUS, TERMINAL DEVICE, AND NETWORK DEVICE", the disclosure of which is hereby incorporated by reference in its entirety.

BACKGROUND

In order to better implement the mobility handover for the terminal device, the network can configure a specific time window for the terminal device, and the terminal device performs measurement within the specific time window, thereby performing mobility handover based on the measurement result. The specific time window is referred to as a Measurement Gap (MG), and can also be referred to as a gap. At present, when the network configures the measurement gap for the terminal device, only one measurement gap can be configured in one period. The duration of one measurement gap is limited, which leads to low measurement efficiency.

SUMMARY

The disclosure relates to the technical field of mobile communication, and particularly to a method and a device for enhancing a measurement gap, a terminal device and a network device. The embodiments of the disclosure provide a method and a device for enhancing a measurement gap, a terminal device and a network device.

The method for enhancing the measurement gap provided by an embodiment of the present disclosure includes:

receiving, by a terminal device, configuration information of a concurrent gap, the concurrent gap including a plurality of measurement gaps, herein the plurality of measurement gaps are configured in a first time period and/or the plurality of measurement gaps are used for measurement in a second time period.

The device for enhancing measurement gap provided by an embodiment of the present disclosure is applied to a terminal device and includes a processor and a memory, wherein the memory is configured to store a computer program, and the processor is configured to call and run the computer program stored in the memory to cause the device to:

receive configuration information of a concurrent gap, the concurrent gap including a plurality of measurement gaps, herein the plurality of measurement gaps are configured in a first time period and/or the plurality of measurement gaps are used for measurement in a second time period.

The method for enhancing the measurement gap provided by an embodiment of the present disclosure includes:

transmitting, by a network device, configuration information of a concurrent gap, the concurrent gap including a plurality of measurement gaps, herein the plurality of measurement gaps are configured in a first time period and/or the plurality of measurement gaps are used for measurement in a second time period.

BRIEF DESCRIPTION OF THE DRAWINGS

The drawings described herein are used to provide a further understanding of the disclosure and form a part of the disclosure. The schematic embodiments of the disclosure and the description thereof are used to explain the disclosure and do not constitute an improper limitation of the application. In the drawings:

FIG. 1 is a schematic diagram of a communication system architecture according to an embodiment of the present disclosure;

FIG. 2 is a flow schematic diagram of a method for enhancing the measurement gap provided by an embodiment of the present disclosure;

FIG. 3 is a first schematic diagram of the structural composition of a device for enhancing the measurement gap provided by an embodiment of the present disclosure;

DETAILED DESCRIPTION

Figures 4, 5:
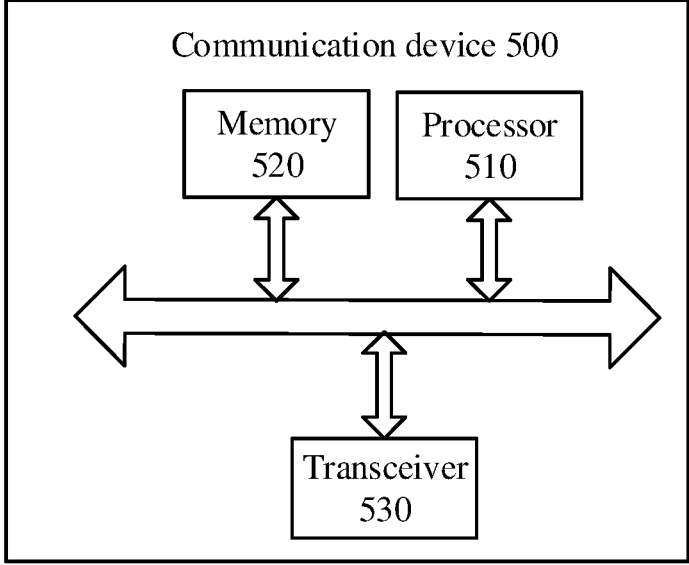
FIG. 4 is a second schematic diagram of the structural composition of a device for enhancing the measurement gap provided by an embodiment of the present disclosure.
FIG. 5 is a schematic structural diagram of a communication device according to an embodiment of the present disclosure.

The description of the technical solutions of the embodiments of the disclosure will be provided below with reference to the accompanying drawings in the embodiments of the disclosure, and it is apparent that the described embodiments are part of the embodiments of the disclosure, not all of them. Based on the embodiments in the disclosure, any other embodiments obtained by those of ordinary skill in the art without making creative effort falls within the scope of protection of the disclosure.

The technical solution of the embodiment of the present disclosure can be applied to various communication systems, for example, Long Term Evolution (LTE) system, LTE Frequency Division Duplex (FDD) system, LTE Time Division Duplex (TDD) system, 5th Generation (5G) communication system or future communication system, etc.

Exemplarily, the communication system 100 applied in the embodiments of the present disclosure is shown in FIG. 1. The communication System 100 may include a Network Device 110 which may be a device that communicates with a terminal 120 (or referred to as a communication terminal or terminal). The network device 110 may provide communication coverage for a particular geographic area and may communicate with terminals located within the coverage area. Alternatively, the network device 110 may be an evolved base station (Evolution Node B, eNB or eNodeB) in an LTE system, or a wireless controller in a Cloud Radio Access Network (CRAN), or the network device can be a mobile switching center, relay station, access point, vehicle-mounted equipment, wearable equipment, hub, switch, bridge, router, network-side device in a 5G network or network device in a future communication system, etc.

The communication system 100 also includes at least one terminal 120 located within the coverage area of the network device 110. A "terminal" used herein includes, but is not limited to, an apparatus arranged to receive/transmit a communication signal through a wired line connection, such as through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Hand-held (DVB-H) network, a satellite network and an Amplitude Modulated (AM)-Frequency Modulated (FM) broadcast transmitter, and/or a device of another terminal device arranged to receive/transmit the communication signal, and/or an Internet of Things (IoT) device. The terminal arranged to communicate through a wireless interface may be referred to as a "wireless communication terminal", a "wireless terminal" or a "mobile terminal". Examples of the mobile terminal include, but are not limited to, satellite or cellular phones, Personal Communications System (PCS) terminals that can combine cellular radiotelephones with data processing, fax, and data communication capabilities, PDAs that can include radiotelephones, pagers, Internet/Intranet access, Web browsers, notebooks, calendars, and/or Global Positioning System (GPS) receivers, and conventional laptop and/or hand-held receivers or other electronic devices including radiotelephone transceivers. The terminal may also be referred to as an access terminal, a User Equipment (UE), a subscriber unit, a subscriber station, a mobile console, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (Session Initiation Protocol, SIP) phone, a Wireless Local Loop (WLL) station, a Personal Digital Assistant (PDA), a hand-held device having a wireless communication function, a computing device or another processing device connected to a wireless modem, an on-board device, a wearable device, a terminal in a 5G network, a terminal in a PLMN in future evolution, or the like.

Alternatively, Device to Device (D2D) communication may be performed between the terminals 120.

Alternatively, the 5G communication system or 5G network may also be referred to as a New Radio (NR) system or an NR network.

FIG. 1 exemplarily illustrates one network device and two terminals. Alternatively, the communication system 100 may include a plurality of network devices and other numbers of terminals may be included within the coverage of each network device, which is not limited by embodiments of the present disclosure.

Alternatively, the communication system 100 may also include other network entities, such as network controller, mobility management entity and the like, which are not limited in the embodiments of the present disclosure.

It is to be understood that a device with the communication function in a network/system in an embodiment of the present disclosure may be referred to as a communication device. Taking the communication system 100 shown in FIG. 1 as an example, the communication device may include a network device 110 and a terminal 120 with the communication function. The network device 110 and the terminal 120 may be specific devices described above and will not be elaborated herein. The communication device may also include other devices in the communication system 100, such as network controller, mobility management entity, and other network entities which are not limited in the embodiments of the present disclosure.

It is to be understood that the terms "system" and "network" in the present disclosure are often used interchangeably herein. The term "and/or" in this specification only describes an association relationship of associated objects and represents that three relationships may exist. For example, A and/or B may represent the following three cases: only A exists, both A and B exist, and only B exists. In addition, the character "/" in the present disclosure generally means that the associated objects has an "or" relationship.

In order to facilitate the understanding of the technical solutions of the embodiments of the present disclosure, the related technologies of the embodiment of the present disclosure are described below. It is to be noted that the following description of the related technologies is for understanding the technical solutions of the embodiment of the present disclosure, and does not limit the technical solutions of the embodiments of the present disclosure.

(1) Measurement Gap

In order to implement better mobility handover, the network can configure the reference signal for the terminal device to measure the target neighbor cell in a specific time window, and the target neighbor cell may be the intra-frequency neighbor cell, the inter-frequency neighbor cell or the inter-RAT neighbor cell. For example, the measurement value of the reference signal may be Reference Signal Received Power (RSRP), or Reference Signal Received Quality (RSRQ), or Signal to Interference plus Noise Ratio (SINR). The specific time window is referred to as measurement gap.

The research of NR system mainly considers two frequency ranges (FR), namely FR1 and FR2. The corresponding frequency ranges of FR1 and FR2 are shown in Table 1 as below, FR1 is also referred to as sub 6 GHz frequency range, and FR2 is also referred to as millimeter wave frequency range. It is to be noted that the frequency ranges corresponding to FR1 and FR2 are not limited to the frequency ranges shown in Table 1, and can also be adjusted.

TABLE 1

| Frequency range | Range of frequency |
| --- | --- |
| FR1 | 450 MHz-6 GHz |
| FR2 | 24.25 GHz-52.6 GHz |

There are two types of measurement gaps according to whether the terminal device supports the capability of operating independently in FR1 and FR2, one is per UE gap, and another is per FR gap. Further, per FR gap is divided into per FR1 gap and per FR2 gap. Per UE gap is also referred to as gapUE, per FR1 gap is also referred to as gapFR1, and per FR2 gap is also referred to as gapFR2. Meanwhile, the terminal device introduces a capability indication of whether to support operating independently in FR1 and FR2, the capability indication is referred to as independentGapConfig, and the capability indication is used for the network to determine whether the measurement gap of per FR type, such as per FR1 gap, per FR2 gap, can be configured. Specifically, if the capability indication is used to indicate that the terminal device supports operating independently in FR1 and FR2, the network can configure a per FR type of measurement gap. If the capability indication is used to indicate that the terminal device does not support operating independently in FR1 and FR2, the network cannot configure a per FR type of measurement gap, and can only configure a per UE type of measurement gap (i.e., per UE gap).

The per FR1 gap, per FR2 gap, and per UE gap are described below.

Per FR1 gap (i.e., gapFR1): the measurement gap belonging to per FR1 gap type is only applicable to the measurement of FR1. It is not supported to configure per FR1 gap and per UE gap simultaneously.

In Evolved-Universal Terrestrial Radio Access (E-EUTA)-New Radio (NR) Dual Connectivity (EN-DC)

mode, the Master Node (MN) is LTE standard, the Secondary Node (SN) is NR standard, and only the MN can configure per FR1 gap.

Per FR2 gap (i.e. gapFR2): the measurement gap belonging to per FR2 gap type is only applicable to the measurement of FR2. It is not supported to configure per FR2 gap and per UE gap simultaneously. It is supported to configure per FR2 gap and per FR1 gap simultaneously.

If the terminal device supports the capability of operating independently in FR1 and FR2 (i.e. independent gap capability), the terminal device can perform independent measurements for FR1 and FR2, and the terminal device can be configured with measurement gap of per FR gap type, such as measurement gap of per FR1 gap type, measurement gap of per FR2 gap type.

Per UE gap (gapUE): the measurement gap belonging to per UE gap type is applicable to the measurement of all frequency ranges (including FR1 and FR2).

In EN-DC mode, the MN is LTE standard, the SN is NR standard, and only the MN can be configured with per UE gap. If per UE gap is configured, per FR gap (such as per FR1 gap, per FR2 gap) cannot be configured again.

During the duration of a measurement gap of the per UE gap type, the terminal device is not allowed to transmit any data nor it is desirable to adjust the receivers of the primary and secondary carriers.

(2) Measurement Configuration

The network configures the measurement configuration (i.e., MeasConfig) through RRC dedicated signaling, as shown in Table 2 below. MeasConfig includes measurement gap configuration and measurement object configuration, and the measurement gap configuration is measGapConfig and the measurement object configuration is measObjectToAddModList.

TABLE 2

```
MeasConfig ::=          SEQUENCE {
    measObjectToAddModList      MeasObjectToAddModList      OPTIONAL, --
Need N
    . . . . . .
    measGapConfig          MeasGapConfig          OPTIONAL,   -- Need M
}
```

Further, the contents of measGapConfig in Table 2 refer to the following Table 3. The configuration information of a measurement gap includes: measurement gap offset (i.e., gapOffset), measurement gap period (i.e., MGRP), and measurement gap length (i.e., MGL). The measurement gap offset is used to determine the starting point of the measurement gap.

TABLE 3

```
MeasGapConfig ::=              SEQUENCE {
    gapFR2              SetupRelease { GapConfig }          OPTIONAL,
    -- Need M
    gapFR1              SetupRelease { GapConfig }          OPTIONAL,
    -- Need M
    gapUE              SetupRelease { GapConfig }          OPTIONAL
    -- Need M
}
GapConfig ::=              SEQUENCE {
    gapOffset              INTEGER (0..159),
    mgl              ENUMERATED {ms1dot5, ms3, ms3dot5, ms4, ms5dot5, ms6},
    mgrp              ENUMERATED {ms20, ms40, ms80, ms160},
    mgta              ENUMERATED {ms0, ms0dot25, ms0dot5},
```

The type of a measurement gap can be per UE gap, per FR1 gap, or per FR2 gap. Referring to Table 4 below, 24 patterns of the measuring gap (abbreviated as gap pattern) are supported, and different gap patterns correspond to different MGRP and/or MGL. Some gap patterns are used to measure FR1, corresponding to per FR1 gap. Some gap patterns are used to measure FR2, corresponding to per FR2 gap.

TABLE 4

| Gap pattern identifier | MGL(ms) | MGRP(ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

In addition to the 24 gap patterns as shown in Table 4, other gap patterns may be introduced, for example, a gap pattern for measuring a Positioning Reference Signal (PRS) may be introduced. Referring to Table 5 as below, two gap patterns identified as 24 and 25 for measuring the PRS are provided.

TABLE 5

| Gap pattern identifier | MGL(ms) | MGRP(ms) |
|---|---|---|
| 24 | 10 | 80 |
| 25 | 20 | 160 |

Further, the contents of the measObjectToAddModList in Table 2 refer to the following Table 6. The SSB Measurement Timing Control (SMTC) associated with the measurement object can be configured in the configuration information of the measurement object, and the configuration of the SMTC can support a period of {5, 10, 20, 40, 80, 160} ms and a window length of {1, 2, 3, 4, 5} ms, and the time offset of the SMTC is strongly related to the period and has a value of {0, . . . , period−1}. Since the carrier frequency is no longer included in the measurement object, SMTC can be configured independently for each measurement object (MO) instead of each frequency point.

TABLE 6

```
MeasObjectToAddModList ::=               SEQUENCE (SIZE (1..maxNrofObjectId)) OF
MeasObjectToAddMod
MeasObjectToAddMod ::=               SEQUENCE {
    measObjectId                   MeasObjectId,
    measObject                     CHOICE {
        measObjectNR                   MeasObjectNR,
        ...,
        measObjectEUTRA                MeasObjectEUTRA
    }
}
}
MeasObjectNR ::=               SEQUENCE {
    ssbFrequency           ARFCN-ValueNR          OPTIONAL,  -- Cond
SSBorAssociatedSSB
    ssbSubcarrierSpacing           SubcarrierSpacing        OPTIONAL, -- Cond
SSBorAssociatedSSB
    smtc1                          SSB-MTC           OPTIONAL,   -- Cond SSBorAssociatedSSB
    smtc2                          SSB-MTC2          OPTIONAL,   -- Cond IntraFreqConnected
    refFreqCSI-RS                  ARFCN-ValueNR          OPTIONAL,   -- Cond CSI-RS
    referenceSignalConfig          ReferenceSignalConfig,
    absThreshSS-BlocksConsolidation      ThresholdNR          OPTIONAL,   -- Need R
    absThreshCSI-RS-Consolidation        ThresholdNR          OPTIONAL,   -- Need R
    nrofSS-BlocksToAverage   INTEGER (2..maxNrofSS-BlocksToAverage)      OPTIONAL,
-- Need R
    nrofCSI-RS-ResourcesToAverage  INTEGER (2..maxNrofCSI-RS-ResourcesToAverage)
OPTIONAL,   -- Need R
    quantityConfigIndex            INTEGER (1..maxNrofQuantityConfig),
    offsetMO                       Q-OffsetRangeList,
    cellsToRemoveList              PCI-List            OPTIONAL,   -- Need N
    cellsToAddModList              CellsToAddModList           OPTIONAL,   -- Need N
    blackCellsToRemoveList         PCI-RangeIndexList          OPTIONAL,   -- Need N
    blackCellsToAddModList    SEQUENCE (SIZE (1..maxNrofPCI-Ranges)) OF PCI-
RangeElement OPTIONAL,    -- Need N
    whiteCellsToRemoveList         PCI-RangeIndexList          OPTIONAL,   -- Need N
    whiteCellsToAddModList    SEQUENCE (SIZE (1..maxNrofPCI-Ranges)) OF PCI-
RangeElement OPTIONAL,    -- Need N
}
```

Referring to Table 7 below, for the intra-frequency measurement in RRC connection state, one frequency layer may be configured with two SMTCs (SMTC and SMTC2), which have the same time offset but different periods. For inter-frequency measurement in RRC connection state, only one SMTC is configured. It can be seen that SMTC2 is only supported to be configured for the intra-frequency measurement. It is to be noted that the period of SMTC2 is shorter than the period of SMTC. The time offset of SMTC2 can adopt the period of SMTC.

TABLE 7

```
SSB-MTC ::=               SEQUENCE {
    periodicityAndOffset           CHOICE {
        sf5                        INTEGER (0..4),
        sf10                       INTEGER (0..9),
        sf20                       INTEGER (0..19),
        sf40                       INTEGER (0..39),
        sf80                       INTEGER (0..79),
        sf160                      INTEGER (0..159)   },
```

TABLE 7-continued

```
    duration            ENUMERATED { sf1, sf2, sf3, sf4, sf5 }
}
SSB-MTC2 ::=            SEQUENCE {
    pci-List    SEQUENCE (SIZE (1..maxNrofPCIsPerSMTC)) OF PhysCellId
OPTIONAL,    -- Need M
    periodicity            ENUMERATED {sf5, sf10, sf20, sf40, sf80, spare3, spare2,
spare1}
}
```

At present, when the network configures the measurement gap for the terminal device, only one measurement gap can be configured in one common period. However, SMTC can be configured independently according to each MO instead of each frequency point, which will lead to that one measurement gap generally cannot cover multiple SMTC time windows or multiple types of reference signals, herein multiple SMTCs may belong to different MOs or the same MO (in case of intra-frequency). If it is needed to implement the measurement in multiple SMTC time windows or the measurement for multiple types of reference signals, a long measurement time is needed, resulting in low measurement efficiency. As such, the following technical solution of the embodiments of the present disclosure is proposed.

FIG. 2 is a flow schematic diagram of a method for enhancing the measurement gap provided by an embodiment of the present disclosure. As illustrated in FIG. 2, the method for enhancing the measurement gap includes operation 201.

At operation 201, the terminal device receives configuration information of a concurrent gap, the concurrent gap includes a plurality of measurement gaps, and the plurality of measurement gaps are configured in a first time period and/or the plurality of measurement gaps are used for measurement in a second time period.

In an embodiment of the present disclosure, a network device transmits the configuration information of a concurrent gap, and accordingly, a terminal device receives the configuration information of the concurrent gap. The concurrent gap includes a plurality of measurement gaps. Herein, there is a concurrent relationship between a plurality of measurement gaps.

In some alternative embodiments, the concurrent relationship between the plurality of measurement gaps may be embodied in that the plurality of measurement gaps are configured in a first time period.

In some alternative embodiments, the concurrent relationship between the plurality of measurement gaps may be embodied in that the plurality of measurement gaps are used for the measurement in a second time period.

In the above solutions, the first time period has any one of following characteristics:

a time window of the first time period is periodic; or the time window of the first time period is aperiodic.

Optionally, the time window of the first time period is aperiodic, for example, the time window of the first time period is single-triggered.

In the above solutions, the second time period has at least one of following characteristics:

a time window of the second time period covers all of the plurality of measurement gaps;

a time window of the second time period covers part of the plurality of measurement gaps; or a starting point of the time window of the second time period is a starting point of a first activated measurement gap in the plurality of measurement gaps.

In some alternative embodiments, the second time period includes the first time period.

It is to be noted that for a measurement gap, the gap type of the measurement gap may be per UE gap or per FR gap. Furthermore, per FR gap can be divided into per FR1 gap and per FR2 gap. The gap pattern of the measurement gap may be any one of the gap patterns shown in Table 4 or Table 5, and the gap pattern of the measurement gap may also be other newly introduced gap patterns.

In the embodiment of the present disclosure, a plurality of measurement gaps with a concurrent relationship satisfy one of the following configuration principles according to the gap type.

First Configuration Principle

In the configuration information of the concurrent gap, per UE gap and per FR gap are not supported to be configured simultaneously.

In some alternative embodiments, all of the plurality of measurement gaps are per UE gaps. For example, the concurrent gap includes measurement gap 1, measurement gap 2, and measurement gap 3, the gap types of all of these three measurement gaps are per UE gap. In other words, the concurrent gap includes three per UE gaps.

In some alternative embodiments, all of the plurality of measurement gaps are per FR gaps. For example, the concurrent gap includes measurement gap 1, measurement gap 2, and measurement gap 3, the gap types of all of these three measurement gaps are per FR gap. In other words, the concurrent gap includes three per FR gaps.

Second Configuration Principle

In the configuration information of the concurrent gap, per UE gap and per FR gap are supported to be configured simultaneously.

In some alternative embodiments, all of the plurality of measurement gaps are per UE gaps. For example, the concurrent gap includes measurement gap 1, measurement gap 2, and measurement gap 3, the gap types of all of these three measurement gaps are per UE gap. In other words, the concurrent gap includes three per UE gaps.

In some alternative embodiments, the plurality of measurement gaps include at least one per FR gap. As en embodiment, part of the plurality of measurement gaps are per UE gaps, and other part of the plurality of measurement gaps are per FR gaps. As another embodiment, all of the plurality of measurement gaps are per FR gaps. For example, the concurrent gap includes measurement gap 1, measurement gap 2, and measurement gap 3. The gap types of all of these three measurement gaps are per FR gap. In other words, the concurrent gap includes three per FR gaps. For example, the concurrent gap includes measurement gap 1, measurement gap 2, and measurement gap 3. The gap type of the measurement gap 1 is per UE gap, and the gap type of measurement gap 2 and measurement gap 3 are per FR gap. In other words, the concurrent gap includes one per UE gap and two per FR gaps. For example, the concurrent gap includes measurement gap 1, measurement gap 2, and measurement gap 3. The gap type of the measurement gap 1 is per FR gap, and the gap types of measurement gap 2 and measurement gap 3 are per UE gap. In other words, the concurrent gap includes one per FR gap and two per UE gaps.

In an embodiment of the present disclosure, optionally, when the network device configures the concurrent gap for the terminal device, the specified limitation needs to be satisfied. Specifically, the concurrent gap satisfies at least one of the following limitations:

a total number of the measurement gaps of the concurrent gap is less than or equal to a first number;

a number of per UE gaps in the concurrent gap is less than or equal to a second number;

a number of per FR gaps in the concurrent gap is less than or equal to a third number, and the number of per FR gaps is equal to a sum of a number of per FR1 gaps and a number of per FR2 gaps;

the number of per FR1 gaps of the concurrent gap is less than or equal to a fourth number; or the number of per FR2 gaps of the concurrent gap is less than or equal to a fifth number.

The above limitations may be reflected by the capability information supported by the terminal device, the terminal device reports the capability information supported by the terminal device, and the capability information is used for indicating at least one of:

a total number of measurement gaps supported by the terminal device is at most the first number;

a number of per UE gaps supported by the terminal device is at most the second number;

a number of per FR gaps supported by the terminal device is at most the third number;

a number of per FR1 gaps supported by the terminal device is at most the fourth number; or a number of per FR2 gaps supported by the terminal device is at most the fifth number.

The network device configures a concurrent gap satisfying the limitation for the terminal device according to the capability information reported by the terminal device. For example, the terminal device reports the capability information, the capability information is used for indicating that the maximum number of per UE gaps supported by the terminal device is X, and the maximum number of per FR gaps supported by the terminal device is Y. X and Y are positive integers. The network device configures X per UE gaps and Y per FR gaps for the terminal device at most according to the capability information.

In embodiments of the present disclosure, the concurrent gap is configured by different network nodes under different network scenarios. How to configure the concurrent gap is described in combination with different network scenarios as following. It is to be noted that in the following description, the description of MN may also be replaced by the Primary Cell (PCell), and the description of SN may also be replaced by the Primary Secondary Cell (PSCell).

First Scenario: New Radio Stand-Alone (NR SA) Scenario

In NR SA scenario, all of the plurality of measurement gaps are configured by the MN.

Second Scenario: New Radio Dual Connectivity (NR-DC) Scenario

In some alternative embodiments, in NR-DC scenario, a first part of the plurality of measurement gaps is configured by a master node (MN), and a second part of the plurality of measurement gaps is configured by a secondary node (SN).

In some alternative embodiments, in NR-DC scenario, all of the plurality of measurement gaps are configured by the MN.

Third Scenario: Multi-Radio Access Technology Dual Connectivity (MR-DC) Scenario In some alternative embodiments, in MR-DC scenario, a first part of the plurality of measurement gaps is configured by a master node (MN), and a second part of the plurality of measurement gaps is configured by an SN.

In some alternative embodiments, in MR-DC scenario, all of the plurality of measurement gaps are configured by the MN.

In an alternative embodiment, the MR-DC is an EN-DC, in EN-DC, the MN is LTE standard and the SN is NR standard. For this case, at least one of per UE gap or per FR1 gap in the plurality of measurement gaps is configured by the MN, and per FR2 gap in the plurality of measurement gaps is configured by the SN.

In an alternative embodiment, the MR-DC is NE-DC, in NE-DC, the MN is NR standard and the SN is LTE standard. For this case, at least one of per UE gap or per FR2 gap in the plurality of measurement gaps is configured by the MN, and per FR1 gap in the plurality of measurement gaps is configured by the SN; or both the per UE gap and per FR gap are configured by the MN.

In the embodiments of the disclosure, if a first part of the plurality of measurement gaps is configured by a master node (MN), and a second part of the plurality of measurement gaps is configured by a secondary node (SN), some information may be negotiated between the MN and the SN to better configure the measurement gaps. It is described below.

Negotiation Manner Between MN and SN

First Negotiation Manner

Manner 1-1): in some alternative embodiments, at least one of a number of the first part of the plurality of measurement gaps or a type of the first part of the plurality of measurement gaps is notified by the MN to the SN for the SN to determine at least one of the number of the measurement gaps or the type of the measurement gaps that can be configured; or at least one of a number of the second part of the plurality of measurement gaps or a type of the second part of the plurality of measurement gaps is notified by the SN to the MN for the MN to determine at least one of the number of the measurement gaps or the type of the measurement gaps that can be configured.

Manner 1-2): in some alternative embodiments, at least one of a number of the first part of the plurality of measurement gaps or a type of the first part of the plurality of measurement gaps is used for the MN to determine first recommendation information, the first recommendation information is notified to the SN by the MN, and the first recommendation information is used to indicate at least one of a number of the measurements gaps or a type of the measurement gaps that the MN recommends the SN to configure; or at least one of a number of the second part of the plurality of measurement gaps or a type of the second part of the plurality measurement gaps is used by the SN to determine second recommendation information, the second recommendation information is notified by the SN to the MN, and the second recommendation information is used to indicate at least one of a number of the measurement gaps or a type of the measurement gaps that the SN recommends the MN to configure.

In an embodiment of the present disclosure, the terminal device reports its capability information, which is used to indicate the number of measurement gaps and the type of measurement gaps supported by the terminal device. With reference to the aforementioned manners, the number of measurement gaps supported by the terminal device may include, for example, at least one of a first number, a second number, a third number, a fourth number or a fifth number. The type of measurement gap supported by the terminal device is, for example, per UE gap or per FR gap. If the terminal device reports its capability information to the MN, the MN may notify the SN of the capability information.

The MN may configure the first part of the measurement gaps according to the capability information of the terminal device, and then notify the SN of the number and/or type of the first part of the measurement gaps, and the SN determines the number and/or type of the measurement gaps that can be configured according to the capability information of the terminal device and the number and/or type of the first part of the measurement gap, thereby configuring the second part of the measurement gaps. The concurrent gap formed by the first part measurement gaps configured by the MN and the second part measurement gaps configured by the SN satisfies the limitation indicated through the capability information of the terminal device. Alternatively, the MN may configure the first part of measurement gaps based on capability information of the terminal device, and then determine the number and/or type of measurement gaps that the SN can configure based on the number and/or type of the first part of measurement gaps. The MN sends the first recommendation information to the SN for indicating the number and/or type of measurement gaps that the MN recommends for the SN to configure.

Similarly, the SN may configure the second part of the measurement gaps according to the capability information of the terminal device, and then notify the MN of the number and/or type of the second part of the measurement gaps, and the MN determines the number and/or type of the measurement gaps that can be configured according to the capability information of the terminal device and the number and/or type of the second part of the measurement gap, thereby configuring the first part of the measurement gaps. The concurrent gap formed by the first part measurement gaps configured by the MN and the second part measurement gaps configured by the SN satisfies the limitation indicated through the capability information of the terminal device. Alternatively, the SN may configure the second part of measurement gaps based on capability information of the terminal device, and then determine the number and/or type of measurement gaps that the MN can configure based on the number and/or type of the second part of measurement gaps. The SN sends the second recommendation information to the MN for indicating the number and/or type of measurement gaps that the SN recommends for the MN to configure.

In the above slotions, alternatively, the interaction information between MN and SN may be carried in the configuration information of CG-config or CG-configinfo.

Second Negotiation Manner

Manner 2-1): In some alternative embodiments, each of the plurality of measurement gaps has an association relationship with a list. The list includes at least one of: a frequency list, a frequency range list, a measurement object list. The association relationship between each measurement gap in the first part of measurement gaps and the list is notified by the MN to the SN for the SN to redetermine the measurement gap associated with each list in combination with the association relationship between each measurement gap in the second part of measurement gaps and the list; and/or, the association relationship between each measurement gap in the second part of measurement gaps and the list is notified by the SN to the MN for the MN to redetermine the measurement gap associated with each list in combination with the association relationship between each measurement gap in the first part of measurement gaps and the list.

For example, the first part of the measurement gaps configured by the MN includes a measurement gap 1, a measurement gap 2, and a measurement gap 3. The measurement gap 1 is per FR1 gap, and associated with the frequency list 1 or a measurement object list 1. The measurement gap 2 is per FR1 gap, and associated with the frequency list 2 or measurement object list 2. The measurement gap 3 is per UE gap, and associated with frequency list 3 or measurement object list. The second part of the measurement gaps configured by the SN includes measurement gap 4. The measurement gap 4 is per FR2 gap, and associated with frequency list 4 or measurement object list 4. After the MN and the SN exchange information of the respective configured measurement gaps, the measurement gap may be allowed to be reassociated with the frequency list or the measurement object list. For example, the frequency list 1 or the measurement object list 1 of FR1 is allowed to be associated with the measurement gap 2, and the frequency list 2 or the measurement object list 2 of FR1 is allowed to be associated with the measurement gap 1.

In embodiments of the present disclosure, the plurality of measurement gaps which are concurrent may be configured according to different criteria, which will be described below.

Manner A: the plurality of measurement gaps are configured according to the reference signal measurement time windows of the measurement objects.

It is to be noted that, typically, the measurement gap is used for SSB measurement, and the plurality of measurement gaps are configured according to the SMTC of the measurement object, here the SMTC is used to determine the SSB measurement time window. Not limited thereto, the measurement gap is also applicable to the measurement of other reference signals, such as CSI-RS, or PRS, and the like, and accordingly, the reference signal measurement time window may be a corresponding CSI-RS measurement time window, or PRS measurement time window, and the like.

It is to be pointed out that most of the following examples take the reference signal measurement time window being SMTC (i.e. SSB measurement time window) as an example, but are not limited to this. The reference signal measurement time window may also be the measurement time window of other reference signals, such as CSI-RS measurement time window, PRS measurement time window, etc.

In some alternative embodiments, a plurality of measurement objects are grouped according to the periods of the reference signal measurement time windows of a plurality of measurement objects, and a measurement gap associated with each group of measurement objects is configured for the group of measurement objects. Herein, a plurality of groups of measurement objects are allowed to be associated with the same measurement gap.

For example, there are four measurement objects, the period of SMTC of measurement object 1 and measurement object 2 is 20 ms, and the period of SMTC of measurement object 3 and measurement object 4 is 40 ms. The measurement object 1 and the measurement object 2 are grouped into a group, and a measurement gap 1 is configured for this group of measurement objects, and the MGL of the measurement gap 1 may be 20 ms. The measurement object 3 and the measurement object 4 are grouped into a group, and a measurement gap 2 is configured for this group of measurement objects, and the MGL of the measurement gap 2 may be 40 ms.

In some alternative embodiments, a plurality of measurement objects are grouped according to the time offsets of the reference signal measurement time windows of a plurality of measurement objects, and a measurement gap associated with each group of measurement objects is configured for the group of measurement objects. Further, optionally, in a case that the periods of the reference signal measurement time windows of the plurality of measurement objects are the same, the plurality of measurement gaps associated with the plurality of groups of measurement objects have the following characteristics: the same period, the same length, and different measurement gap offsets.

For example, there are four measurement objects, the periods of SMTCs of measurement object 1, measurement object 2, measurement object 3 and measurement object 4 are the same, such as 20 ms. The time offsets of SMTCs of measurement object 1 and measurement object 2 are $\Delta 1$, and the time offsets of SMTCs of measurement object 3 and measurement object 4 are $\Delta 2$. The measurement object 1 and the measurement object 2 are grouped into a group, and a measurement gap 1 is configured for this group of measurement objects. The measurement object 3 and the measurement object 4 are grouped into a group, and a measurement gap 2 is configured for this group of measurement objects. Both the periods and lengths of measurement gap 1 and measurement gap 2 are the same. That is, the measurement gap 1 and measurement gap 2 correspond to the same gap pattern identifier, but the measurement gap offsets of the measurement gap 1 and measurement gap 2 are different.

Manner B: the plurality of measurement gaps are configured according to the type of reference signal.

In some alternative embodiments, the type of reference signal includes at least one of: a synchronization signal block (SSB), a channel state indication reference signal (CSI-RS), or a positioning reference signal (PRS).

For example, the terminal device measures the SSB and PRS simultaneously, and the measurement gap for measuring the SSB is measurement gap 1, and the measurement gap for measuring the PRS is measurement gap 2. Optionally, the measurement gap 1 and the measurement gap 2 correspond to different gap pattern identifiers.

Manner C: the plurality of measurement gaps are configured according to the radio access technology (RAT) type of the network.

For example, the measurement gap 1 is configured for NR for the measurement of NR frequency or NR measurement object. The measurement gap 2 is configured for LTE for the measurement of LTE frequency or NR measurement object.

For example, per UE gap is configured for NR, and per FR1 gap is configured for LTE.

For example, per FR1 gap is configured for NR FR1, per FR2 gap is configured for NR FR2, and per FR1 gap is configured for LTE.

Manner D: the plurality of measurement gaps are configured according to the frequency list.

For example, the measurement gaps are configured for intra-frequency list 1, inter-frequency list 1, intra-frequency list 2 and inter-frequency list 2, respectively.

Manner E: the plurality of measurement gaps are configured according to the frequency range list.

For example, a measurement gap is configured for each of frequency range list 1, frequency range list 2, and frequency range list 3. In particular, one measurement gap may be separately configured for the unlicensed band.

Manner F: the plurality of measurement gaps are configured according to the measurement object list.

For example, a measurement gap is configured for each of intra-frequency measurement object list 1, inter-frequency frequency object list 1, intra-frequency measurement object list 2, and inter-frequency frequency object list 2.

In embodiments of the present disclosure, the concurrent gap which has been configured may be updated (i.e. maintained), as described below.

First Update Manner

In an embodiment of the present disclosure, one or more pre-configured measurement gaps (pre-configured MGs) may be preconfigured through the RRC dedicated signaling, and the pre-configured measurement gaps may be used once they are subsequently activated. The pre-configured measurement gap is activated, which will affect the concurrent gap which has been configured.

Manner 1) After the pre-configured measurement gap is activated, the concurrent gap includes the pre-configured measurement gap and the plurality of measurement gaps. After the pre-configured measurement gap is deactivated, the concurrent gap includes the plurality of measurement gaps.

Here, after the pre-configured measurement gap is activated, the pre-configured measurement gap is not considered when determining whether the concurrent gap satisfies the limitation, and the pre-configured measurement gap can be directly activated and concurrent with a plurality of configured measurement gaps.

Manner 2) After the pre-configured measurement gap is activated, in response to that the pre-configured measurement gap and the plurality of measurement gaps meet the specified limitation, the concurrent gap includes the pre-configured measurement gap and the plurality of measurement gaps; or in response to that the pre-configured measurement gap and the plurality of measurement gaps do not meet the specified limitation, the concurrent gap is updated based on the priorities of the measurement gaps.

Here, after the pre-configured measurement gap is activated, when determining whether the concurrent gap satisfies the limitation, the pre-configured measurement gap is considered, and if the pre-configured measurement gap and the plurality of configured measurement gaps satisfy the specified limitation, the pre-configured measurement gap and the plurality of measurement gaps are concurrent. Alternatively, if the pre-configured measurement gap and the configured plurality of measurement gaps do not satisfy the specified limitation, the concurrent gap is updated based on the priorities of the measurement gaps.

In some alternative embodiments, the specified limitations include at least one of the following limitations:

a total number of the pre-configured measurement gaps and the plurality of measurement gaps is less than or equal to a first number;

the pre-configured measurement gap belongs to per UE gap, and a number of per UE gaps in the pre-configured measurement gaps and the plurality of measurement gaps is less than or equal to a second number;

the pre-configured measurement gap belongs to per FR gap, and a number of per FR gaps in the pre-configured measurement gaps and the plurality of measurement gaps is less than or equal to a third number;

the pre-configured measurement gap belongs to per FR1 gap, and a number of per FR1 gaps in the pre-configured measurement gaps and the plurality of measurement gaps is less than or equal to a fourth number; or the pre-configured measurement gap belongs to per FR2 gap, and a number of per FR2 gaps in the pre-configured measurement gaps and the plurality of measurement gaps is less than or equal to a fifth number.

In the above solutions, the concurrent gap is updated based on the priorities of the measurement gaps, which can be implemented by the following ways.

In response to that a priority of the pre-configured measurement gap is higher than a priority of a first measurement gap in the plurality of measurement gaps, the first measurement gap is discarded, and the concurrent gap includes the pre-configured measurement gap and the measurement gaps in the plurality of measurement gaps other than the first measurement gap; or in response to that the priority of the pre-configured measurement gap is lower than the priority of each of the plurality of measurement gaps, the pre-configured measurement gap is discarded, and the concurrent gap includes the plurality of measurement gaps.

In some alternative embodiments, N of the plurality of measurement gaps have a priority lower than the priority of the pre-configured measurement gap, N is a positive integer. The first measurement gap is the measurement gap with the lowest priority in the N measurement gaps. In some alternative embodiments, the types of the N measurement gaps are the same as the type of the pre-configured measurement gap.

Further, after the pre-configured measurement gap is deactivated, a second measurement gap is supplemented to the concurrent gap. In some alternative embodiments, the second measurement gap is a previously discarded measurement gap. In some alternative embodiments, the type of the second measurement gap is same as the type of the pre-configured measurement gap.

Second Update Manner

In embodiments of the present disclosure, in response to that the plurality of measurement gaps satisfy the specified limitation, the concurrent gap includes the plurality of measurement gaps; or in response to that the plurality of measurement gaps do not satisfy the specified limitation, the concurrent gap is updated based on the priorities of the measurement gaps.

In some alternative embodiments, the specified limitations include at least one of the following limitations:

a total number of the plurality of measurement gaps is less than or equal to a first number;

a number of per UE gaps in the plurality of measurement gaps is less than or equal to a second number;

a number of per FR gaps in the plurality of measurement gaps is less than or equal to a third number;

the number of per FR1 gaps in the plurality of measurement gaps is less than or equal to a fourth number; or the number of per FR2 gaps in the plurality of measurement gaps is less than or equal to a fifth number.

In the above solutions, the concurrent gap is updated based on the priorities of the measurement gaps, which can be implemented by the following ways.

The first measurement gap determined according to the priorities is discarded, and the concurrent gap includes the measurement gaps in the plurality of measurement gaps other than the first measurement gap.

In some alternative embodiments, the first measurement gap determined according to the priorities refers to: the measurement gap with the lowest priority in the plurality of measurement gaps; or the measurement gap with the lowest priority in the per UE gaps in the plurality of measurement gaps; or the measurement gap with the lowest priority in the per FR gaps in the plurality of measurement gaps; or the measurement gap with the lowest priority in the per FR1 gaps in the plurality of measurement gaps; or the measurement gap with the lowest priority in the per FR2 gaps in the plurality of measurement gaps.

According to the technical solution of the embodiment of the disclosure, a plurality of measurement gaps which are concurrent are configured, such that it can be implemented that the plurality of measurement gaps can cover more measurement objects or reference signals for measuring together, thereby avoiding the complexity and delay brought by the reconfiguration and improving the efficiency of mobility handover. Further, shorter measurement gaps can be configured to reduce the throughput loss and reduce the impact on the performance of existing networks and terminal devices. In addition, based on the coordination among the network nodes, the flexible matching for the measurement gaps of some frequency points or measurement objects can be implemented in batches.

FIG. 3 is a first schematic diagram of the structural composition of a device for enhancing the measurement gap provided by an embodiment of the present disclosure. As illustrated in FIG. 3, the device for enhancing the measurement gap, applied to the terminal device includes a receiving unit 301.

The receiving unit 301 is configured to receive configuration information of a concurrent gap, the concurrent gap includes a plurality of measurement gaps, and the plurality of measurement gaps are configured in a first time period and/or the plurality of measurement gaps are used for measurement in a second time period.

In some alternative embodiments, the first time period has any one of following characteristics:

a time window of the first time period is periodic; or the time window of the first time period is aperiodic.

In some alternative embodiments, the second time period has any one of following characteristics:

a time window of the second time period covers all of the plurality of measurement gaps;

a time window of the second time period covers part of the plurality of measurement gaps; or a starting point of the time window of the second time period is a starting point of a first activated measurement gap in the plurality of measurement gaps.

In some alternative embodiments, the second time period includes the first time period.

In some alternative embodiments, in the configuration information of the concurrent gap, per UE gap and per FR gap are not supported to be configured simultaneously.

In some alternative embodiments, all of the plurality of measurement gaps are per UE; or all of the plurality of measurement gaps are per FR gaps.

In some alternative embodiments, in the configuration information of the concurrent gap, per UE gap and per FR gap are supported to be configured simultaneously.

In some alternative embodiments, all of the plurality of measurement gaps are per UE; or the plurality of measurement gaps includes at least one per FR gap.

In some alternative embodiments, the plurality of measurement gaps including at least one per FR gap includes:

part of the plurality of measurement gaps are per UE gaps, and other part of the plurality of measurement gaps are per FR gaps; or all of the plurality of measurement gaps are per FR gaps.

In some alternative embodiments, the concurrent gap satisfy at least one of the following limitations:

a total number of the measurement gaps in the concurrent gap is less than or equal to a first number;

a number of per UE gaps in the concurrent gap is less than or equal to a second number;

a number of per FR gaps in the concurrent gap is less than or equal to a third number, and the number of per FR gaps is equal to a sum of a number of per FR1 gaps and a number of per FR2 gaps;

the number of per FR1 gaps in the concurrent gap is less than or equal to a fourth number; or the number of per FR2 gaps in the concurrent gap is less than or equal to a fifth number.

In some alternative embodiments, the device further includes a transmitting unit.

The transmitting unit (not illustrated in figures) is configured to report capability information supported by the terminal device, the capability information is used for indicating at least one of:

a total number of measurement gaps supported by the terminal device is at most the first number;

a number of per UE gaps supported by the terminal device is at most the second number;

a number of per FR gaps supported by the terminal device is at most the third number;

a number of per FR1 gaps supported by the terminal device is at most the fourth number; or a number of per FR2 gaps supported by the terminal device is at most the fifth number.

In some alternative embodiments, in NR SA scenario, all of the plurality of measurement gaps are configured by the MN.

In some alternative embodiments, in NR-DC scenario, a first part of the plurality of measurement gaps is configured by a master node (MN), and a second part of the plurality of measurement gaps is configured by a secondary node (SN); or all of the plurality of measurement gaps are configured by the MN.

In some alternative embodiments, in MR-DC scenario, a first part of the plurality of measurement gaps is configured by a master node (MN), and a second part of the plurality of measurement gaps is configured by a secondary node (SN); or all of the plurality of measurement gaps are configured by the MN.

In some alternative embodiments, in a case that the MR-DC is EN-DC, at least one of per UE gap or per FR1 gap in the plurality of measurement gaps is configured by the MN, and per FR2 gap in the plurality of measurement gaps is configured by the SN.

In some alternative embodiments, in a case that the MR-DC is NE-DC, at least one of per UE gap or per FR2 gap in the plurality of measurement gaps is configured by the MN, and per FR1 gap in the plurality of measurement gaps is configured by the SN; or both the per UE gap and the per FR gap in the plurality of measurement gaps are configured by the MN.

In some alternative embodiments, at least one of a number of the first part of the plurality of measurement gaps or a type of the first part of the plurality of measurement gaps is notified by the MN to the SN for the SN to determine at least one of a number of measurement gaps or a type of measurement gaps that can be configured; or at least one of a number of the second part of the plurality of measurement gaps or a type of the second part of the plurality of measurement gaps is notified by the SN to the MN for the MN to determine at least one of the number of the measurement gaps or the type of the measurement gaps that can be configured.

In some alternative embodiments, at least one of a number of the first part of the plurality of measurement gaps or a type of the first part of the plurality of measurement gaps is used for the MN to determine first recommendation information, the first recommendation information is notified to the SN by the MN, and the first recommendation information is used to indicate at least one of a number of measurements gaps or a type of measurement gaps that the MN recommends the SN to configure; or at least one of a number of the second part of the plurality of measurement gaps or a type of the second part of the plurality of measurement gaps is used for the SN to determine second recommendation information, the second recommendation information is notified by the SN to the MN, and the second recommendation information is used to indicate at least one of a number of the measurement gaps or a type of the measurement gaps that the SN recommends the MN to configure.

In some alternative embodiments, each of the plurality of measurement gaps is associated with a list, and the list comprises at least one of: a frequency list, a frequency range list, or a measurement object list;

an association relationship between each measurement gap in the first part of the plurality of measurement gaps and a list is notified by the MN to the SN for the SN to redetermine a measurement gap associated with each list in combination with an association relationship between each measurement gap in the second part of the plurality of the measurement gaps and a list; and/or an association relationship between each measurement gap in the second part of the plurality of measurement gaps and a list is notified by the SN to the MN for the MN to redetermine a measurement gap associated with each list in combination with an association relationship between each measurement gap in the first part of the plurality of measurement gaps and a list.

In some alternative embodiments, the plurality of measurement gaps are configured according to the reference signal measurement time windows of the measurement objects.

In some alternative embodiments, the plurality of measurement gaps being configured according to the reference signal measurement time windows of the measurement objects includes:

grouping a plurality of measurement objects according to periods of reference signal measurement time windows of the plurality of measurement objects, and configuring a measurement gap associated with each group of measurement objects for the group of measurement objects.

In some alternative embodiments, the plurality of measurement gaps being configured according to the reference signal measurement time windows of the measurement objects includes:

grouping a plurality of measurement objects according to time offsets of reference signal measurement time windows of the plurality of measurement objects, and configuring a measurement gap associated with each group of measurement objects for the group of measurement objects.

In some alternative embodiments, in a case that the periods of the reference signal measurement time windows of the plurality of measurement objects are the same, the plurality of measurement gaps associated with the plurality of groups of measurement objects have the following characteristics: the same period, the same length, and different measurement gap offsets.

In some alternative embodiments, the plurality of measurement gaps are configured according to the type of reference signal.

In some alternative embodiments, the type of the reference signal includes at least one of: SSB, CSI-RS or PRS.

In some alternative embodiments, the plurality of measurement gaps are configured according to the RAT type of the network.

In some alternative embodiments, the plurality of measurement gaps are configured according to the frequency list.

In some alternative embodiments, the plurality of measurement gaps are configured according to the frequency range list.

In some alternative embodiments, the plurality of measurement gaps are configured according to the measurement object list.

In some alternative embodiments, after the pre-configured measurement gap is activated, the concurrent gap includes the pre-configured measurement gap and the plurality of measurement gaps.

In some alternative embodiments, after the pre-configured measurement gap is deactivated, the concurrent gap includes the plurality of measurement gaps.

In some alternative embodiments, after the pre-configured measurement gap is activated, in response to that the pre-configured measurement gap and the plurality of measurement gaps satisfy a specified limitation, the concurrent gap includes the pre-configured measurement gap and the plurality of measurement gaps; or in response to that the pre-configured measurement gap and the plurality of measurement gaps do not satisfy the specified limitation, the concurrent gap is updated based on priorities of measurement gaps.

In some alternative embodiments, the specified limitations include at least one of the following limitations:

a total number of the pre-configured measurement gap and the plurality of measurement gaps is less than or equal to a first number;

the pre-configured measurement gap belongs to per UE gap, and a number of per UE gaps in the pre-configured measurement gap and the plurality of measurement gaps is less than or equal to a second number;

the pre-configured measurement gap belongs to per FR gap, and a number of per FR gaps in the pre-configured measurement gaps and the plurality of measurement gaps is less than or equal to a third number;

the pre-configured measurement gap belongs to per FR1 gap, and a number of per FR1 gaps in the pre-configured measurement gap and the plurality of measurement gaps is less than or equal to a fourth number; or the pre-configured measurement gap belongs to per FR2 gap, and a number of per FR2 gaps in the pre-configured measurement gap and the plurality of measurement gaps is less than or equal to a fifth number.

In some alternative embodiments, the concurrent gap being updated based on the priorities of the measurement gaps includes:

in response to that a priority of the pre-configured measurement gap is higher than a priority of a first measurement gap in the plurality of measurement gaps, discarding the first measurement gap, and the concurrent gap including the pre-configured measurement gap and the measurement gaps in the plurality of measurement gaps other than the first measurement gap; or in response to that the priority of the pre-configured measurement gap is lower than the priority of each of the plurality of measurement gaps, discarding the pre-configured measurement gap, and the concurrent gap including the plurality of measurement gaps.

In some alternative embodiments, N of the plurality of measurement gaps have a priority lower than the priority of the pre-configured measurement gap, N is a positive integer.

The first measurement gap is a measurement gap with a lowest priority in the N measurement gaps.

In some alternative embodiments, the types of the N measurement gaps are the same as the gap type of the pre-configured measurement gap.

In some alternative embodiments, after the pre-configured measurement gap is deactivated, the concurrent gap is supplemented with the second measurement gap.

In some alternative embodiments, the second measurement gap is a previously discarded measurement gap.

In some alternative embodiments, the type of the second measurement gap is same as the gap type of the pre-configured measurement gap.

In some alternative embodiments, in response to that the plurality of measurement gaps satisfy a specified limitation, the concurrent gap includes the plurality of measurement gaps; or in response to that the plurality of measurement gaps do not satisfy the specified limitation, the concurrent gap is updated based on priorities of measurement gaps.

In some alternative embodiments, the specified limitations include at least one of the following limitations:

a total number of the plurality of measurement gaps is less than or equal to a first number;

a number of per UE gaps in the plurality of measurement gaps is less than or equal to a second number;

a number of per FR gaps in the plurality of measurement gaps is less than or equal to a third number;

the number of per FR1 gaps in the plurality of measurement gaps is less than or equal to a fourth number; or the number of per FR2 gaps in the plurality of measurement gaps is less than or equal to a fifth number.

In some alternative embodiments, the concurrent gap being updated based on the priorities of the measurement gaps includes:

discarding the first measurement gap determined according to the priorities, the concurrent gap including the measurement gaps in the plurality of measurement gaps other than the first measurement gap.

In some alternative embodiments, the first measurement gap determined according to the priorities refers to:

a measurement gap with a lowest priority in the plurality of measurement gaps; or a measurement gap with a lowest priority in per UE gaps in the plurality of measurement gaps; or a measurement gap with a lowest priority in per FR gaps in the plurality of measurement gaps; or a measurement gap with a lowest priority in per FR1 gaps in the plurality of measurement gaps; or a measurement gap with a lowest priority in per FR2 gaps in the plurality of measurement gaps.

It is to be understood for those skilled in the art that the above-described description of the device for enhancing measuring gap according to the embodiments of the present disclosure may be understood with reference to the description of the method for enhancing measuring gap according to the embodiments of the present disclosure.

FIG. 4 is a second schematic diagram of the structural composition of a device for enhancing the measurement gap provided by an embodiment of the present disclosure. As illustrated in FIG. 4, the device for enhancing the measurement gap, applied to the network device, includes a transmitting unit 401.

The transmitting unit 401 is configured to transmit configuration information of a concurrent gap, the concurrent gap includes a plurality of measurement gaps, and the plurality of measurement gaps are configured in a first time period and/or the plurality of measurement gaps are used for measurement in a second time period.

In some alternative embodiments, in the configuration information of the concurrent gap, per UE gap and per FR gap are not supported to be configured simultaneously.

In some alternative embodiments, all of the plurality of measurement gaps are per UE; or all of the plurality of measurement gaps are per FR gaps.

In some alternative embodiments, in the configuration information of the concurrent gap, per UE gap and per FR gap are supported to be configured simultaneously.

In some alternative embodiments, all of the plurality of measurement gaps are per UE; or the plurality of measurement gaps includes at least one per FR gap.

In some alternative embodiments, the plurality of measurement gaps including at least one per FR gap includes:

part of the plurality of measurement gaps are per UE gaps, and other part of the plurality of measurement gaps are per FR gaps; or all of the plurality of measurement gaps are per FR gaps.

In some alternative embodiments, in NR SA scenario, all of the plurality of measurement gaps are configured by the MN.

In some alternative embodiments, in NR-DC scenario, a first part of the plurality of measurement gaps is configured by a master node (MN), and a second part of the plurality of measurement gaps is configured by a secondary node (SN); or all of the plurality of measurement gaps are configured by the MN.

In some alternative embodiments, in MR-DC scenario, a first part of the plurality of measurement gaps is configured by a master node (MN), and a second part of the plurality of measurement gaps is configured by a secondary node (SN); or all of the plurality of measurement gaps are configured by the MN.

In some alternative embodiments, at least one of a number of the first part of the plurality of measurement gaps or a type of the first part of the plurality of measurement gaps is notified by the MN to the SN for the SN to determine at least one of a number of measurement gaps or a type of measurement gaps that can be configured; or at least one of a number of the second part of the plurality of measurement gaps or a type of the second part of the plurality of measurement gaps is notified by the SN to the MN for the MN to determine at least one of the number of the measurement gaps or the type of the measurement gaps that can be configured.

In some alternative embodiments, at least one of a number of the first part of the plurality of measurement gaps or a type of the first part of the plurality of measurement gaps is used for the MN to determine first recommendation information, the first recommendation information is notified to the SN by the MN, and the first recommendation information is used to indicate at least one of a number of measurements gaps or a type of measurement gaps that the MN recommends the SN to configure; or at least one of a number of the second part of the plurality of measurement gaps or a type of the second part of the plurality of measurement gaps is used for the SN to determine second recommendation information, the second recommendation information is notified by the SN to the MN, and the second recommendation information is used to indicate at least one of a number of the measurement gaps or a type of the measurement gaps that the SN recommends the MN to configure.

It is to be understood for those skilled in the art that the above-described description of the device for enhancing measuring gap according to the embodiments of the present disclosure may be understood with reference to the description of the method for enhancing measuring gap according to the embodiments of the present disclosure.

FIG. 5 is a schematic structural diagram of a communication device 500 according to an embodiment of the present disclosure. The communication device 500 may be a terminal device or a network device. The communication device 500 illustrated in FIG. 5 includes a processor 510, and the processor 510 can call and run computer programs from memory to implement the method in the embodiments of the present disclosure.

Optionally, as illustrated in FIG. 5, the communication device 500 may further include a memory 520. The processor 510 can call and run the computer program from memory 520 to implement the method in the embodiments of the disclosure.

The memory 520 may be a separate device independent of or integrated into the processor 510.

Optionally, as illustrated in FIG. 5, the communication device 500 may further include a transceiver 530, and the processor 510 may control the transceiver 530 to communicate with other devices, particularly, to transmit information or data to other devices or receive information or data transmitted by other devices.

The transceiver 530 may include a transmitter and a receiver. The transceiver 530 may further include an antenna, and the number of the antennas may be one or more.

Optionally, the communication device 500 may specifically be the network device in the embodiments of the present disclosure, and the communication device 500 may implement the corresponding processes implemented by the network device in the methods of the embodiments of the disclosure. For the sake of brevity, it will not be elaborated herein.

Optionally, the communication device 500 may specifically be the mobile terminal/terminal device in the embodiments of the present disclosure, and the communication device 500 may implement the corresponding processes implemented by the mobile terminal/terminal device in the methods of the embodiment of the disclosure. For the sake of simplicity, it will not be elaborated herein.

Figure 6:
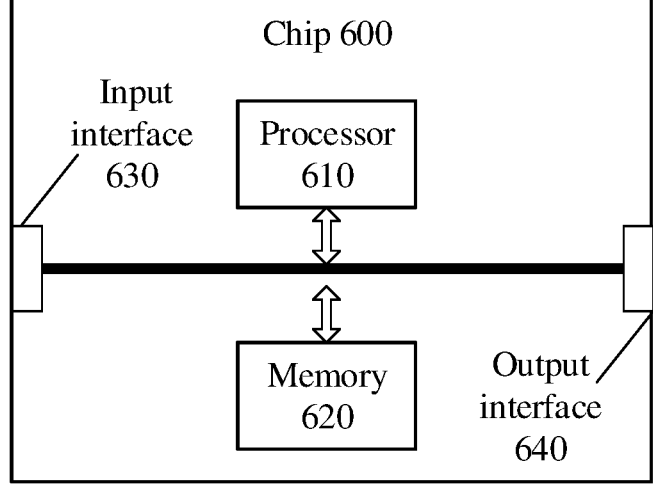
FIG. 6 is a schematic structural diagram of a chip according to an embodiment of the present disclosure.

FIG. 6 is a schematic structural diagram of a chip according to an embodiment of the present disclosure. The chip 600 illustrated in FIG. 6 includes processor 610, and processor 610 can call and run computer programs from memory to implement the method in the embodiments of the present disclosure.

Optionally, as illustrated in FIG. 6, the chip 600 may further include a memory 620. The processor 610 can call and run the computer program from memory 620 to implement the method in the embodiments of the disclosure.

The memory 620 may be a separate device independent of or integrated into the processor 610.

Optionally, the chip 600 may also include an input interface 630. The processor 610 can control the input interface 630 to communicate with other devices or chips, and in particular can obtain information or data sent by other devices or chips.

Optionally, the chip 600 may also include an output interface 640. The processor 610 may control the output interface 640 to communicate with other devices or chips, and in particular may output information or data to other devices or chips.

Optionally, the chip can be applied to the network device in the embodiments of the present disclosure, and the chip can implement the corresponding process realized by the network device in each method of the embodiments of the disclosure. For the sake of brevity, it will not be elaborated herein.

Optionally, the chip can be applied to the mobile terminal/terminal device in the embodiments of the present disclosure, and the chip can implement the corresponding flow realized by the mobile terminal/terminal device in each method of the embodiment of the disclosure. For the sake of simplicity, it will not be described here.

It is to be understood that the chips mentioned in the embodiments of the present disclosure can also be referred to as system level chips, system chips, chip systems or on-chip system chips, etc.

Figure 7:
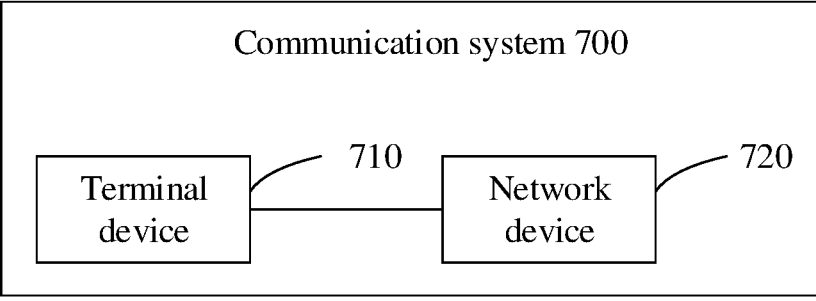
FIG. 7 is a schematic block diagram of a communication system according to an embodiment of the present disclosure.

FIG. 7 is a schematic block diagram of a communication system 700 according to an embodiment of the present disclosure. As illustrated in FIG. 7, the communication system 700 includes a terminal device 710 and a network device 720.

The terminal device 710 can be used to realize the corresponding functions realized by the terminal device in the above method, and the network device 720 can be used to realize the corresponding functions realized by the network device in the above method. For the sake of simplicity, it will not be elaborated here.

It is to be understood that the processor of the embodiment of the present disclosure may be an integrated circuit chip with signal processing capability. During the implementation, the various operations of the above method embodiment may be implemented by the integrated logic circuit of hardware in processor or instructions in the form of software. The above processors can be general purpose processors, digital signal processors (DSPs), application specific integrated circuits (ASICs), field programmable gate arrays (FPGAs) or other programmable logic devices, discrete gate or transistor logic devices, and discrete hardware components. The disclosed methods, operations and logic block diagrams in the embodiments of the present disclosure can be implemented or executed. The general-purpose processor may be a microprocessor or the processor may be any conventional processor or the like. The operations of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the operations of the above method in combination with its hardware.

It is to be understood that the memory in the embodiments of the present disclosure may be volatile memory or non-volatile memory, or may include both volatile and non-volatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. By way of examplary illustration, but not limitation, many forms of RAM are available, such as static RAM (SRAM), dynamic RAM (DRAM), synchronous DRAM (SDRAM), double data rate SDRAM (DDR SDRAM, enhanced SDRAM (ES-DRAM), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiment of the present disclosure, and the computer program enables the computer to execute the corresponding processes implemented by the network device in the various methods of the embodiment of the present disclosure. For the sake of brevity, it will not be elaborated here.

Optionally, the computer-readable storage medium can be applied to the mobile terminal/UE in the embodiment of the present disclosure, and the computer program enables the computer to execute the corresponding processes implemented by the mobile terminal/UE in the various methods of the embodiment of the present disclosure. For the sake of brevity, it will not be elaborated here.

The embodiment of the present disclosure also provides a computer program product, including a computer program instruction.

Optionally, the computer program product can be applied to the network device in the embodiments of the present disclosure, and the computer program instruction enables the computer to execute the corresponding processes implemented by the network device in the various methods of the embodiment of the disclosure. For the sake of brevity, it will not be elaborated here.

Optionally, the computer program product can be applied to the mobile terminal/terminal device in the embodiments of the present disclosure, and the computer program instruction enables the computer to execute the corresponding process implemented by the mobile terminal/terminal device in the various methods of the embodiment of the disclosure, for the sake of brevity, it will not be elaborated here.

The embodiment of the present disclosure also provides a computer program.

Optionally, the computer program can be applied to the network device in the embodiments of the present disclosure. When the computer program runs on the computer, the computer executes the corresponding processes implemented by the network device in various method of the embodiment of the disclosure. For the sake of brevity, it will not be elaborated here.

Optionally, the computer program can be applied to the mobile terminal/terminal device in the embodiments of the present disclosure. When the computer program runs on the computer, the computer executes the corresponding processes implemented by the mobile terminal/terminal device in the various methods of the embodiment of the disclosure. For the sake of brevity, it will not be elaborated here.

Those of ordinary skill in the art may realize that the units and algorithm steps of the various examples described in combination with the disclosed embodiments herein can be implemented by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be elaborated here.

In several embodiments provided by the present disclosure, it is to be understood that the disclosed systems, devices and methods can be implemented in other ways. For example, the embodiment of the device described above is only schematic. For example, the division of the units is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is implemented in the form of a software function unit and sold or used as an independent product, it can be stored in a computer readable storage medium. Based on such understanding, the technical solution of the present disclosure in essence or the part contributing to the related art or part of the technical solution may be embodied in the form of software product, which is stored in a storage medium, includes several instructions for enabling a computer device (which can be a personal computer, a server, a network device, etc.) to perform all or part of the operations of the method according to each embodiment of the present disclosure. The aforementioned storage media include: U disk, mobile hard disk, read-only memory (ROM), random access memory (RAM), disk or optical disk and other media that can store program code.

The description above is only the specific embodiments of the present disclosure, and is not intended to limit the scope of protection of the embodiments of the present disclosure. Any change and replacement is easily to think within the technical scope of the embodiments of the present by those skilled in the art, and fall with the protection scope of the present disclosure. Therefore, the scope of protection of the embodiments of the present disclosure shall be subject to the scope of protection of the claims.

The invention claimed is:

1. A method for enhancing a measurement gap, comprising:

receiving, by a terminal device, configuration information of a concurrent gap, the concurrent gap comprising a plurality of measurement gaps, wherein at least one of following applies: the plurality of measurement gaps are configured in a first time period or the plurality of measurement gaps are used for measurement in a second time period, wherein the plurality of measurement gaps are configured according to reference signal measurement time windows of measurement objects;

wherein the plurality of measurement gaps being configured according to the reference signal measurement time windows of the measurement objects comprises:

grouping a plurality of measurement objects according to periods of reference signal measurement time windows of the plurality of measurement objects, and configuring a measurement gap associated with each group of measurement objects for the group of measurement objects; or grouping a plurality of measurement objects according to time offsets of reference signal measurement time windows of the plurality of measurement objects, and configuring a measurement gap associated with each group of measurement objects for the group of measurement objects; wherein in a case that periods of the reference signal measurement time windows of the plurality of measurement objects are same, a plurality of measurement gaps associated with the plurality of groups of measurement objects have following characteristics: same period, same length, and different measurement gap offsets.

2. The method of claim 1, wherein the second time period has any one of following characteristics:

a time window of the second time period covers all of the plurality of measurement gaps;

the time window of the second time period covers part of the plurality of measurement gaps; or a starting point of the time window of the second time period is a starting point of a first activated measurement gap in the plurality of measurement gaps.

3. The method of claim 1, wherein in the configuration information of the concurrent gap, per User Equipment (UE) gap and per Frequency range (FR) gap are not supported to be configured simultaneously, wherein all of the plurality of measurement gaps are per UE gaps, or all of the plurality of measurement gaps are per FR gaps; or wherein in the configuration information of the concurrent gap, per UE gap and per FR gap are supported to be configured simultaneously, wherein all of the plurality of measurement gaps are per UE gaps, or the plurality of measurement gaps comprises at least one per FR gap;

wherein the plurality of measurement gaps comprising at least one per FR gap comprises:

part of the plurality of measurement gaps are per UE gaps, and other part of the plurality of measurement gaps are per FR gaps; or all of the plurality of measurement gaps are per FR gaps.

4. The method of claim 3, wherein the concurrent gap satisfies at least one of following limitations:

a total number of the measurement gaps in the concurrent gap is less than or equal to a first number;

a number of per UE gaps in the concurrent gap is less than or equal to a second number;

a number of per FR gaps in the concurrent gap is less than or equal to a third number, and the number of per FR gaps is equal to a sum of a number of per FR1 gaps and a number of per FR2 gaps;

the number of per FR1 gaps in the concurrent gap is less than or equal to a fourth number; or the number of per FR2 gaps in the concurrent gap is less than or equal to a fifth number;

wherein the method further comprises:

reporting, by the terminal device, capability information supported by the terminal device, the capability information being used for indicating at least one of:

a total number of measurement gaps supported by the terminal device is at most the first number;

a number of per UE gaps supported by the terminal device is at most the second number;

a number of per FR gaps supported by the terminal device is at most the third number;

a number of per FR1 gaps supported by the terminal device is at most the fourth number; or a number of per FR2 gaps supported by the terminal device is at most the fifth number.

5. The method of claim 1, wherein in a new radio stand-alone (NR SA) scenario, all of the plurality of measurement gaps are configured by a master node (MN); or wherein in a new radio dual connectivity (NR-DC) scenario, a first part of the plurality of measurement gaps is configured by a master node (MN), and a second part of the plurality of measurement gaps is configured by a secondary node (SN), or all of the plurality of measurement gaps are configured by the MN; or wherein in a multi-radio access technology dual connectivity (MR-DC) scenario, a first part of the plurality of measurement gaps is configured by a master node (MN), and a second part of the plurality of measurement gaps is configured by a secondary node (SN), or all of the plurality of measurement gaps are configured by the MN.

6. The method of claim 5, wherein in a case that the MR-DC is Evolved-Universal Terrestrial Radio Access-New Radio Dual Connectivity (EN-DC), at least one of per UE gap or per FR1 gap in the plurality of measurement gaps is configured by the MN, and per FR2 gap in the plurality of measurement gaps is configured by the SN; or wherein in a case that MR-DC is New Radio-Evolved-Universal Terrestrial Radio Access Dual Connectivity (NE-DC), at least one of per UE gap or per FR2 gap in the plurality of measurement gaps is configured by the MN, and per FR1 gap in the plurality of measurement gaps is configured by the SN; or both per UE gap and per FR gap in the plurality of measurement gaps are configured by the MN.

7. The method of claim 5, wherein at least one of a number of the first part of the plurality of measurement gaps or a type of the first part of the plurality of measurement gaps is notified by the MN to the SN for the SN to determine at least one of a number of measurement gaps or a type of measurement gaps that are capable of being configured; or at least one of a number of the second part of the plurality of measurement gaps or a type of the second part of the plurality of measurement gaps is notified by the SN to the MN for the MN to determine at least one of the number of the measurement gaps or the type of the measurement gaps that are capable of being configured;

wherein at least one of a number of the first part of the plurality of measurement gaps or a type of the first part of the plurality of measurement gaps is used for the MN to determine first recommendation information, the first recommendation information is notified by the MN to the SN, and the first recommendation information is used to indicate at least one of a number of measurements gaps or a type of measurement gaps that the MN recommends the SN to configure; or at least one of a number of the second part of the plurality of measurement gaps or a type of the second part of the plurality of measurement gaps is used for the SN to determine second recommendation information, the second recommendation information is notified by the SN to the MN, and the second recommendation information is used to indicate at least one of a number of the measurement gaps or a type of the measurement gaps that the SN recommends the MN to configure.

8. The method of claim 5, wherein each of the plurality of measurement gaps is associated with a list, and the list comprises at least one of: a frequency list, a frequency range list, or a measurement object list;

at least one of following applies:

an association relationship between each measurement gap in the first part of the plurality of measurement gaps and a list is notified by the MN to the SN for the SN to redetermine a measurement gap associated with each list in combination with an association relationship between each measurement gap in the second part of the plurality of the measurement gaps and a list; or an association relationship between each measurement gap in the second part of the plurality of measurement gaps and a list is notified by the SN to the MN for the MN to redetermine a measurement gap associated with each list in combination with an association relationship between each measurement gap in the first part of the plurality of measurement gaps and a list.

9. The method of claim 1, wherein the plurality of measurement gaps are configured according to a radio access technology (RAT) type of a network; or wherein the plurality of measurement gaps are configured according to a frequency list; or wherein the plurality of measurement gaps are configured according to a frequency range list; or wherein the plurality of measurement gaps are configured according to a measurement object list.

10. The method of claim 1, wherein after a pre-configured measurement gap is activated, the concurrent gap comprises the pre-configured measurement gap and the plurality of measurement gaps.

11. The method of claim 1, wherein after a pre-configured measurement gap is activated, in response to that the pre-configured measurement gap and the plurality of measurement gaps satisfy a specified limitation, the concurrent gap comprises the pre-configured measurement gap and the plurality of measurement gaps; or in response to that the pre-configured measurement gap and the plurality of measurement gaps do not satisfy the specified limitation, the concurrent gap is updated based on priorities of measurement gaps;

wherein the specified limitation comprises at least one of:

a total number of the pre-configured measurement gap and the plurality of measurement gaps is less than or equal to a first number;

the pre-configured measurement gap belongs to per UE gap, and a number of per UE gaps in the pre-configured measurement gap and the plurality of measurement gaps is less than or equal to a second number;

the pre-configured measurement gap belongs to per FR gap, and a number of per FR gaps in the pre-configured measurement gaps and the plurality of measurement gaps is less than or equal to a third number;

the pre-configured measurement gap belongs to per FR1 gap, and a number of per FR1 gaps in the pre-configured measurement gap and the plurality of measurement gaps is less than or equal to a fourth number; or the pre-configured measurement gap belongs to per FR2 gap, and a number of per FR2 gaps in the pre-configured measurement gap and the plurality of measurement gaps is less than or equal to a fifth number;

wherein the concurrent gap being updated according to the priorities of the measurement gaps comprises:

in response to that a priority of the pre-configured measurement gap is higher than a priority of a first measurement gap in the plurality of measurement gaps, discarding the first measurement gap, the concurrent gap comprising the pre-configured measurement gap and measurement gaps in the plurality of measurement gaps other than the first measurement gap; or in response to that the priority of the pre-configured measurement gap is lower than a priority of each of the plurality of measurement gaps, discarding the pre-configured measurement gap, the concurrent gap comprising the plurality of measurement gaps.

12. The method of claim 1, wherein in response to that the plurality of measurement gaps satisfy a specified limitation, the concurrent gap comprises the plurality of measurement gaps; or in response to that the plurality of measurement gaps do not satisfy the specified limitation, the concurrent gap is updated based on priorities of measurement gaps;

wherein the specified limitation comprises at least one of:

a total number of the plurality of measurement gaps is less than or equal to a first number;

a number of per UE gaps in the plurality of measurement gaps is less than or equal to a second number;

a number of per FR gaps in the plurality of measurement gaps is less than or equal to a third number;

the number of per FR1 gaps in the plurality of measurement gaps is less than or equal to a fourth number; or the number of per FR2 gaps in the plurality of measurement gaps is less than or equal to a fifth number;

wherein the concurrent gap being updated according to the priorities of the measurement gaps comprises:

discarding a first measurement gap determined according to the priorities, the concurrent gap comprising measurement gaps in the plurality of measurement gaps other than the first measurement gap;

wherein the first measurement gap determined according to the priorities refers to:

a measurement gap with a lowest priority in the plurality of measurement gaps; or a measurement gap with a lowest priority in per UE gaps in the plurality of measurement gaps; or a measurement gap with a lowest priority in per FR gaps in the plurality of measurement gaps; or a measurement gap with a lowest priority in per FR1 gaps in the plurality of measurement gaps; or a measurement gap with a lowest priority in per FR2 gaps in the plurality of measurement gaps.

13. A device for enhancing a measurement gap, applied to a terminal device, comprising a processor, a transceiver and a non-transitory memory, wherein the non-transitory memory is configured to store a computer program, and the processor is configured to call and run the computer program stored in the non-transitory memory, and control the transceiver to:

receive configuration information of a concurrent gap, the concurrent gap comprising a plurality of measurement gaps, wherein at least one of following applies: the plurality of measurement gaps are configured in a first time period or the plurality of measurement gaps are used for measurement in a second time period, wherein the plurality of measurement gaps are configured according to reference signal measurement time windows of measurement objects;

wherein the plurality of measurement gaps being configured according to the reference signal measurement time windows of the measurement objects comprises:

grouping a plurality of measurement objects according to periods of reference signal measurement time windows of the plurality of measurement objects, and configuring a measurement gap associated with each group of measurement objects for the group of measurement objects; or grouping a plurality of measurement objects according to time offsets of reference signal measurement time windows of the plurality of measurement objects, and configuring a measurement gap associated with each group of measurement objects for the group of measurement objects; wherein in a case that periods of the reference signal measurement time windows of the plurality of measurement objects are same, a plurality of measurement gaps associated with the plurality of groups of measurement objects have following characteristics: same period, same length, and different measurement gap offsets.

14. The device of claim 13, wherein the second time period has any one of following characteristics:

a time window of the second time period covers all of the plurality of measurement gaps;

a time window of the second time period covers part of the plurality of measurement gaps; or a starting point of the time window of the second time period is a starting point of a first activated measurement gap in the plurality of measurement gaps.

15. The device of claim 13, wherein in the configuration information of the concurrent gap, per User Equipment (UE) gap and per Frequency range (FR) gap are not supported to be configured simultaneously;

wherein all of the plurality of measurement gaps are per UE gaps, or all of the plurality of measurement gaps are per FR gaps; or wherein in the configuration information of the concurrent gap, per User Equipment (UE) gap and per Frequency range (FR) gap are supported to be configured simultaneously;

wherein all of the plurality of measurement gaps are per UE gaps, or the plurality of measurement gaps comprises at least one per FR gap;

wherein the plurality of measurement gaps comprising at least one per FR gap comprises:

part of the plurality of measurement gaps are per UE gaps, and other part of the plurality of measurement gaps are per FR gaps; or all of the plurality of measurement gaps are per FR gaps.

16. The device of claim 15, wherein the concurrent gap satisfies at least one of following limitations:

a total number of the measurement gaps in the concurrent gap is less than or equal to a first number;

a number of per UE gaps in the concurrent gap is less than or equal to a second number;

a number of per FR gaps in the concurrent gap is less than or equal to a third number, and the number of per FR gaps is equal to a sum of a number of per FR1 gaps and a number of per FR2 gaps;

the number of per FR1 gaps in the concurrent gap is less than or equal to a fourth number; or the number of per FR2 gaps in the concurrent gap is less than or equal to a fifth number;

wherein the transceiver is further configured to:

report capability information supported by the terminal device, the capability information being used for indicating at least one of:

a total number of measurement gaps supported by the terminal device is at most the first number;

a number of per UE gaps supported by the terminal device is at most the second number;

a number of per FR gaps supported by the terminal device is at most the third number;

a number of per FR1 gaps supported by the terminal device is at most the fourth number; or a number of per FR2 gaps supported by the terminal device is at most the fifth number.

17. The device of claim 13, wherein in a new radio stand-alone (NR SA) scenario, all of the plurality of measurement gaps are configured by a master node (MN); or wherein in a new radio dual connectivity (NR-DC) scenario, a first part of the plurality of measurement gaps is configured by a master node (MN), and a second part of the plurality of measurement gaps is configured by a secondary node (SN), or all of the plurality of measurement gaps are configured by the MN; or wherein in a multi-radio access technology dual connectivity (MR-DC) scenario, a first part of the plurality of measurement gaps is configured by a master node (MN), and a second part of the plurality of measurement gaps is configured by a secondary node (SN), or all of the plurality of measurement gaps are configured by the MN.

18. A device for enhancing a measurement gap, applied to a network device, comprising a processor, a transceiver and a non-transitory memory, wherein the non-transitory memory is configured to store a computer program, and the processor is configured to call and run the computer program stored in the non-transitory memory, and control the transceiver to:

transmit configuration information of a concurrent gap, the concurrent gap comprising a plurality of measurement gaps, wherein at least one of following applies: the plurality of measurement gaps are configured in a first time period or the plurality of measurement gaps are used for measurement in a second time period, wherein the plurality of measurement gaps are configured according to reference signal measurement time windows of measurement objects;

wherein the plurality of measurement gaps being configured according to the reference signal measurement time windows of the measurement objects comprises:

grouping a plurality of measurement objects according to periods of reference signal measurement time windows of the plurality of measurement objects, and configuring a measurement gap associated with each group of measurement objects for the group of measurement objects; or grouping a plurality of measurement objects according to time offsets of reference signal measurement time windows of the plurality of measurement objects, and configuring a measurement gap associated with each group of measurement objects for the group of measurement objects; wherein in a case that periods of the reference signal measurement time windows of the plurality of measurement objects are same, a plurality of measurement gaps associated with the plurality of groups of measurement objects have following characteristics: same period, same length, and different measurement gap offsets.

19. The device of claim 18, wherein in the configuration information of the concurrent gap, per User Equipment (UE) gap and per Frequency range (FR) gap are not supported to be configured simultaneously, wherein all of the plurality of measurement gaps are per UE gaps, or all of the plurality of measurement gaps are per FR gaps; or wherein in the configuration information of the concurrent gap, per UE gap and per FR gap are supported to be configured simultaneously, wherein all of the plurality of measurement gaps are per UE gaps, or the plurality of measurement gaps comprises at least one per FR gap;

wherein the plurality of measurement gaps comprising at least one per FR gap comprises:

part of the plurality of measurement gaps are per UE gaps, and other part of the plurality of measurement gaps are per FR gaps; or all of the plurality of measurement gaps are per FR gaps.

20. The device of claim 18, wherein in a new radio stand-alone (NR SA) scenario, all of the plurality of measurement gaps are configured by a master node (MN); or wherein in a new radio dual connectivity (NR-DC) scenario, a first part of the plurality of measurement gaps is configured by a master node (MN), and a second part of the plurality of measurement gaps is configured by a secondary node (SN), or all of the plurality of measurement gaps are configured by the MN; or wherein in a multi-radio access technology dual connectivity (MR-DC) scenario, a first part of the plurality of measurement gaps is configured by a master node (MN), and a second part of the plurality of measurement gaps is configured by a secondary node (SN), or all of the plurality of measurement gaps are configured by the MN.

\* \* \* \* \*